(12) United States Patent
De Mello et al.

(10) Patent No.: US 12,416,564 B2
(45) Date of Patent: Sep. 16, 2025

(54) METHOD AND MICROFLUIDIC DEVICE FOR STUDYING CELL DEFORMATIONS

(71) Applicant: ETH Zurich, Zurich (CH)

(72) Inventors: Andrew De Mello, Zürich (CH); Stavros Stavrakis, Zürich (CH); Xiaobao Cao, Guangzhou (CN); Mohammad Asghari, Zürich (CH); Mahmut Aslan, Männedorf (CH); Bogdan Mateescu, Zürich (CH); Yingchao Meng, Zürich (CH)

(73) Assignee: ETH Zurich, Zurich (CH)

( * ) Notice: Subject to any disclaimer, the term of this patent is extended or adjusted under 35 U.S.C. 154(b) by 144 days.

(21) Appl. No.: 18/288,218

(22) PCT Filed: Apr. 22, 2022

(86) PCT No.: PCT/EP2022/060656
§ 371 (c)(1),
(2) Date: Oct. 25, 2023

(87) PCT Pub. No.: WO2022/229011
PCT Pub. Date: Nov. 3, 2022

(65) Prior Publication Data
US 2024/0210301 A1    Jun. 27, 2024

(30) Foreign Application Priority Data
Apr. 26, 2021 (EP) .................... 21170422

(51) Int. Cl.
*G01N 15/1404* (2024.01)
*B01L 3/00* (2006.01)
*G01N 15/14* (2024.01)
*G01N 15/1433* (2024.01)

(52) U.S. Cl.
CPC .... *G01N 15/1404* (2013.01); *B01L 3/502761* (2013.01); *G01N 15/1433* (2024.01);
(Continued)

(58) Field of Classification Search
CPC ........... G01N 15/1404; G01N 15/1433; G01N 15/1484; G01N 2015/1495;
(Continued)

(56) References Cited

U.S. PATENT DOCUMENTS

2010/0178666 A1   7/2010   Leshansky et al.
2014/0322801 A1   10/2014   Bransky et al.
(Continued)

FOREIGN PATENT DOCUMENTS

CN    103439241 A    12/2013

OTHER PUBLICATIONS

Cha, Sukgyun, et al., "Cell Stretching Measurement Utilizing Viscoelastic Particle Focusing", Anal. Chem, 2012, pp. 10471-10477, vol. 84.
(Continued)

*Primary Examiner* — Md M Rahman
(74) *Attorney, Agent, or Firm* — The Webb Law Firm

(57) ABSTRACT

In a method of investigating cell deformations, a sample fluid including cells suspended in a suspending medium is provided. A flow of the sample fluid through a focusing microchannel is established. The suspending medium is a non-Newtonian fluid having viscoelastic properties such that cells that enter the focusing microchannel are focused towards a center of the focusing microchannel due to the viscoelastic properties of the suspending medium, causing the cells to exit the focusing microchannel in single file. Subsequently, the sample fluid that has exited the focusing microchannel is caused to flow through a deformation microchannel arranged downstream of the focusing microchannel to cause a deformation of cells that have exited the focusing microchannel and have entered the deformation
(Continued)

microchannel, the deformation being caused by a flow pattern created by interaction of the fluid flow with the deformation microchannel.

6 Claims, 9 Drawing Sheets

(52) U.S. Cl.
CPC .. *G01N 15/1484* (2013.01); *B01L 2200/0636* (2013.01); *G01N 2015/1495* (2013.01)

(58) Field of Classification Search
CPC ... G01N 2015/1413; G01N 2015/1497; G01N 15/1459; B01L 3/502761; B01L 2200/0636
USPC .......................................................... 356/32
See application file for complete search history.

(56) References Cited

U.S. PATENT DOCUMENTS

| | | |
|---|---|---|
| 2016/0202172 A1 | 7/2016 | Guck et al. |
| 2017/0234788 A1 | 8/2017 | Di Carlo et al. |

OTHER PUBLICATIONS

Gossett, Daniel R., et al., "Hydrodynamic stretching of single cells for large population mechanical phenotyping", PNAS, May 15, 2012, pp. 7630-7635, vol. 109, No. 20.

Nawaz, Ahmad Ahsan, et al., "Intelligent image-based deformation-assisted cell sorting with molecular specificity", Nature Methods, Jun. 2020, pp. 595-599, vol. 17.

Otto, Oliver, et al., "Real-time deformability cytometry: on-the-fly cell mechanical phenotyping", Nature Methods, Mar. 2015, pp. 199-202, vol. 12, No. 3.

Rosendahl, Philipp, et al., "Real-time fluorescence and deformability cytometry", Nature Methods, May 2018, pp. 355-358, vol. 15, No. 5.

Rosendahl, Philipp, et al., "Real-time fluorescence and deformability cytometry", Nature Methods, May 2018, Supplementary Material.

Seo, Kyung Won, et al., "Particle migration and single-line particle focusing in microscale pipe flow of viscoelastic fluids", RSC Adv., 2014, pp. 3512-3520, vol. 4.

Urbanska, Marta, et al., "A comparison of microfluidic methods for high-throughput cell deformability measurements", Nature Methods, 2020, pp. 587-593, vol. 17.

Yan, Sheng, et al., "Continuous microfluidic 3D focusing enabling microflow cytometry for single-cell analysis", Talanta, Jan. 1, 2020, vol. 221, No. 121401.

METHOD AND MICROFLUIDIC DEVICE FOR STUDYING CELL DEFORMATIONS

CROSS REFERENCE TO RELATED APPLICATIONS

This application is the United States national phase of International Patent Application No. PCT/EP2022/060656 filed Apr. 22, 2022, and claims priority to European Patent Application No. 21170422.6 filed Apr. 26, 2021, the disclosures of which are hereby incorporated by reference in their entireties.

BACKGROUND OF THE INVENTION

Field of the Invention

The present invention relates to a method of investigating cell deformations and to a system, a microfluidic device and a cartridge for use in such a method.

Description of Related Art

In recent years, much attention has focused on the characterization of cells within biofluids with a view to unraveling biomarkers and detecting various types of diseases. For example, in sepsis disease, immune response to infection becomes dysregulated, resulting in damage to blood vessels and to organs like the kidney. This dysregulation is initiated by morphological and structural changes in the white blood cells, which may manifest themselves in changes in deformability of these cells. Accordingly, such alteration can be detected at the cell level before major damage happens to organs. As another example, cancerous cells are typically more deformable than non-cancerous cells and can therefore be distinguished from healthy cells by their mechanical properties.

In order to study structural changes at the single cell level, various methods have been introduced, including atomic force microscopy (AFM), impedance-based passage time, gradual micropore filtering, micropipette aspiration, optical tweezers, magnetic tweezers, quantitative phase imaging, and magnetic twisting cytometry. Even though single cell measurement techniques give very accurate values that indicate the deformability of the cells, they have very low measurement throughput and tedious operation procedures for both sample preparation and data acquisition, which thereby limits most of these techniques to proof of concept demonstrations. In addition, some of these methods require the presence of a probe within the platform (AFM cantilever, electrodes, or microporous filters), which may cause problems due to contamination of the cells by contact with the probe.

Microfluidics-based approaches constitute an attractive alternative. These approaches enable high throughput, offer the capability of integration with other methods, provide good biocompatibility and can be used with small sample volumes. Three microfluidics-based approaches for measuring cell mechanical phenotype have been distinguished in the literature as constriction-based deformability cytometry (CDC), shear flow deformability cytometry (sDC), and extensional flow deformability cytometry (xDC). A recent overview over these methods is provided in M. Urbanska et al., "A comparison of microfluidic methods for high-throughput cell deformability measurements", Nature Methods 17, 587-593 (2020), DOI: 10.1038/s41592-020-0818-8.

Constriction-based deformability cytometry (CDC) relies on driving cells through a constriction smaller than their diameter and measuring the time cells need to pass through the constriction. The deformability of cells is typically directly deduced from their passage time. This approach is disadvantageous in that the cells typically contact the walls of the constriction.

In contrast, both shear flow deformability cytometry (sDC) and extensional flow deformability cytometry (xDC) work in a contactless manner. Both methods employ hydrodynamic flow to induce cell deformation and infer cell deformability from image-based evaluation of cell shape. However, they use very different geometries, and they probe deformation at different timescales and Reynolds numbers.

In xDC, cells are stretched by placing them at a junction where two counterpropagating liquid flows meet. The cells are delivered to the junction at several meters per second and are fully decelerated and deformed within a few microseconds. The Reynolds number is typically very high, i.e., inertial forces strongly dominate over viscous forces. Examples of xDC are disclosed in US2017234788A1 and in Daniel R. Gossett et al., "Hydrodynamic stretching of single cells for large population mechanical phenotyping", Proceedings of the National Academy of Sciences May 2012, 109 (20) 7630-7635; DOI: 10.1073/pnas. 1200107109.

In sDC, cells are driven into a funnel-like constriction in a microfluidic channel, where they are deformed by shear forces and pressure gradients into a bullet-like shape without contacting the channel walls. The Reynolds number is typically lower than 1, indicating that viscous forces dominate. Examples are provided in US20160202172A1 and in O. Otto et al., "Real-time deformability cytometry: on-the-fly cell mechanical phenotyping", Nature Methods 12, 199-202 (2015), DOI: 10.1038/nmeth.3281.

In the context of sDC, it has been proposed to focus the cells into a one-dimensional array upstream of the constriction using a sheath flow, such that the cells reach the constriction in single file. Examples are disclosed in P. Rosendahl et al., "Real-time fluorescence and deformability cytometry", Nature Methods 15, 355-358 (2018), DOI: 10.1038/nmeth.4639 (see, in particular, FIG. 1b and Supplementary FIG. 1), and A. A. Nawaz et al., "Intelligent image-based deformation-assisted cell sorting with molecular specificity", Nature Methods 17, 595-599 (2020), DOI: 10.1038/s41592-020-0831-y (see, in particular, FIG. 2a). The sheath flow typically requires flow rates that are higher than the flow rate of the sample flow, a typical ratio being 3:1. Both the fluid in which the cells are suspended and the fluid used for the sheath flow are Newtonian fluids. A Newtonian fluid is a fluid in which the viscous stresses arising from its flow, at every point, are linearly correlated to the local strain rate. More precisely, a fluid is Newtonian if the tensors that describe the viscous stress and the strain rate are related by a constant viscosity tensor.

US 2010/0178666 A1 discloses a method of focusing particles wherein a suspension of the particles in a suspending medium is passed along a microchannel. The suspending medium has such viscoelastic properties that flowing the suspension in the channel directs the particles towards the center of the microchannel. US 2014/0322801 A1 discloses an apparatus for examining particles, comprising a cartridge having a microchannel. A viscoelastic fluid that comprises particles flows in the microchannel. The particles are aligned in a one- or two-dimensional array parallel to the fluid flow. An optical magnifying means generates an image of the particles in the microchannel. Applications include fluorescence-activated cell sorting (FACS), rheological measurements, and binding assays. No applications in cell deformability studies are disclosed.

SUMMARY OF THE INVENTION

In a first aspect, it is an object of the present invention to provide a method of investigating cell deformation which enables high throughput while not requiring a sheath flow.

According to the first aspect of the invention, a method of investigating cell deformations is provided. The method comprises:

providing a sample fluid comprising cells suspended in a suspending medium;

establishing a flow of the sample fluid through a focusing microchannel, wherein the suspending medium is a non-Newtonian fluid having viscoelastic properties such that cells that enter the focusing microchannel are focused towards a center of the focusing microchannel due to the viscoelastic properties of the suspending medium, causing the cells to substantially exit the focusing microchannel in single file or in a two-dimensional array; and causing cells that have exited the focusing microchannel to flow through a deformation microchannel arranged downstream of the focusing microchannel to cause deformation of cells in the flow, the deformation being caused by a flow pattern created by interaction of the flow with the walls of the deformation microchannel.

In this method, cells are focused to a focus region at the center of a first microchannel, called the focusing microchannel, by viscoelastic focusing in a non-Newtonian fluid, without requiring any sheath fluid. In some embodiments, in particular, in embodiments where the width and height dimensions of the focusing microchannel are approximately equal, the focus region may be a cylindrical region that includes the centerline of the focusing microchannel. Preferably, the cells are lined up, one by one, such that the centers of at least 90% of the cells, more preferably at least 95% or even at least 99% of the cells, are within a cylinder having a radius that is about the same as a typical radius of the cells. In other embodiments, in particular, in embodiments wherein the focusing microchannel has significantly greater width than height, the focus region may be a thin sheet that includes a central plane of the focusing microchannel. In such embodiments, the cells are preferably arranged in a sheet-like array such that the centers of at least 90% of the cells, more preferably at least 95% or even at least 99% of the cells, are within a sheet-like region having a height that is about the same as a typical radius of the cells. In addition to aligning the cells in the focus region, viscoelastic focusing may also considerably reduce the longitudinal dispersion of the cells, causing the cells to exit the focusing microchannel at roughly equal longitudinal distance.

Subsequently, the cells are transferred to a second microchannel, which is called the deformation microchannel. In the deformation microchannel, the cells are deformed by hydrodynamic forces caused by interaction of the flow of the suspending medium with the channel walls. Deformation of the cells may be achieved without direct contact of the cells with the channel walls.

With the presently proposed method, cell deformation can be studied at very high throughput. The method can be applied in a wide range of applications. The method is particularly well-suited for high-throughput applications like the detection of rare events in populated samples or therapeutic applications like activation of T-cells or cell transfection/injection.

The focusing microchannel will generally have a larger cross-sectional area than the deformation microchannel. More particularly, the focusing microchannel may have a first cross-sectional area perpendicular to the flow direction of the flow of the sample fluid. The first cross-sectional area may be constant over the entire length of the focusing microchannel, or it may vary along its length, having a minimum somewhere along its length. For instance, the focusing microchannel may be straight, or it may taper towards its outlet end, causing the first cross-sectional area to have a minimum at the outlet end of the focusing microchannel. Likewise, the deformation microchannel may have a second cross-sectional area perpendicular to the flow direction which may be constant over the entire length of the deformation microchannel, or which may vary along its length, having a minimum somewhere along its length. The constant first cross-sectional area or the minimum of the first cross-sectional area is then preferably larger than the constant second cross-sectional area or the minimum of the second cross-sectional area, preferably at least by a factor of 4, more preferably at least by a factor of 9.

In absolute numbers, with regard to the focusing microchannel, the constant first cross-sectional area or the minimum of the first cross-sectional area is preferably at least minimum of the first cross-sectional area is preferably at least 1000 $\mu m^2$ to prevent deformation effects from occurring in the focusing microchannel. On the other hand, the constant first cross-sectional area or the minimum of the first cross-sectional area is preferably not more than 10'000 $\mu m^2$ to ensure that the cells will actually be focused to the center region of the focusing microchannel. The focusing microchannel may have approximately square cross-sectional shape, having a width that is essentially equal to its height, width and height preferably differing by not more than 20%. This will cause cells to exit the focusing microchannel essentially in single file. In other embodiments, the focusing microchannel may have a rectangular cross-sectional shape with a width that is much greater than the height of the channel, e.g., by a factor of 2 or more. This will cause cells to exit the focusing microchannel essentially in a two-dimensional array.

With regard to the deformation microchannel, the constant second cross-sectional area or the minimum of the second cross-sectional area is preferably not more than 500 $\mu m^2$ in order to achieve a significant deformation of the cells. On the other hand, the constant second cross-sectional area or the minimum of the second cross-sectional area is preferably not less than 50 $\mu m^2$ to prevent cells from touching the channel walls of the deformation microchannel or even clogging the deformation microchannel. The deformation microchannel preferably has approximately square cross-sectional shape, having a width that is essentially equal to its height, width and height preferably differing by not more than 20%.

The focusing microchannel is preferably much longer than the deformation microchannel in order to achieve sufficient focusing. In particular, the focusing microchannel is preferably longer than the deformation microchannel by at least a factor of 20, more preferably by at least a factor of 50. In absolute numbers, the focusing microchannel preferably has a length of at least 10 mm, more preferably at least 20 mm.

The deformation microchannel should preferably be kept comparatively short in order to minimize the differential pressure that is required to drive the sample fluid through the narrow deformation microchannel. In preferred embodiments, the deformation microchannel has a length of not more than 1 mm, more preferably not more than 500 µm. On the other hand, the deformation microchannel should preferably be sufficiently long to cause considerable deformations. In practice, the deformation microchannel should preferably have a length of not less than 100 µm, more preferably not less than 200 µm.

In preferred embodiments, the focusing microchannel has a constant first height perpendicular to the flow direction and a first width perpendicular to the flow direction that is either constant or varies along the length of the focusing microchannel, having a minimum. A focusing microchannel with constant height and constant or variable width is particularly easy to manufacture by standard lithographic processes. Likewise, the deformation microchannel preferably has a constant second height and a second width that is either constant or varies along the length of the deformation microchannel, having a minimum. Again, such a deformation microchannel is particularly easy to manufacture. It is then preferred that the first height is larger than the second height, preferably at least by a factor of 2, and that the constant first width or the minimum of the first width is larger than the constant second width or the minimum of the second width, preferably at least by a factor of 2.

The suspending medium may be, in particular, a shear-thinning medium, whose viscosity decreases with shear rate. In preferred embodiments, the suspending medium is an aqueous solution of a high-molecular mass polymer. Preferably, the polymer is water-soluble and biocompatible. Preferably, the polymer has a molecular mass of at least 50 kDa, more preferably at least 500 kDa. Examples of suitable polymers include polyethylene oxide (PEO), polyacrylamide (PAA), polyethylene glycol (PEG), Ficoll, polysucrose, and methylcellulose. The concentration of the polymer may be adjusted to achieve the desired viscoelasticity. Typical concentration levels are in the range of 0.01% to 2% w/v.

The focusing and deformation microchannels may be comprised in a single microfluidic device. The flow through the focusing and deformation microchannels may be established by applying a pressure difference between an inlet and an outlet of the microfluidic device. In particular, an inlet reservoir may be connected to the inlet of the microfluidic device, and positive pressure may be applied to the inlet reservoir. In some embodiments, the pressure may be applied mechanically, e.g., if the inlet reservoir is formed by a syringe in a syringe pump. In preferred embodiments, however, the pressure is applied pneumatically by pressurizing a gas volume in the inlet reservoir above the sample fluid, using a pneumatic pressure source.

The flow rate through the focusing and deformation microchannels and the resulting linear flow velocity of the cells in these channels may vary within a broad range, depending on the dimensions of these channels, the viscoelastic properties of the suspending medium and the pressure difference applied across the microfluidic device. Typical values for the linear flow velocity of the cells along the flow direction in the deformation microchannel are 1 to 1000 cm/s. Typical values for the linear flow velocity of the cells in the focusing microchannel are lower due to the its larger cross-sectional area and may vary broadly from 0.1 to more than 10 or even 100 cm/s.

Since no sheath flow is required in the presently proposed concept, the method may be readily parallelized by arranging multiple deformation microchannels in parallel, enabling simultaneous observation of cells in multiple deformation microchannels. To this end, the sample fluid may be passed through an array of parallel deformation microchannels arranged in a device plane downstream of the array of focusing microchannels, wherein adjacent deformation microchannels are laterally separated by separating walls.

In embodiments with multiple parallel deformation microchannels, an array of parallel focusing microchannels in the device plane may be provided for focusing the cells upstream of the deformation microchannels, wherein adjacent focusing microchannels are laterally separated by separating walls. Each focusing microchannel may then be aligned with at least one associated deformation microchannel in such a manner that cells exiting each said focusing microchannel enter said at least one associated deformation microchannel. The sample fluid may be supplied to the array of focusing microchannels through a single common inlet of the microfluidic device in which the focusing and deformation microchannels are formed, i.e., only a single flow-generating device is required to establish the flow of the sample fluid through the parallel focusing and deformation microchannels. The width of the separating walls between the focusing microchannels is preferably smaller than the width of each focusing microchannel.

It is conceivable to provide more than one single inlet for supplying sample fluid to the array of deformation microchannels. For instance, two, three or more inlets may be provided, each inlet providing sample fluid to different focusing microchannels. A different cell line may then be supplied through each of the inlets. In this manner, multiple cell lines may be investigated in parallel. The different inlets may be pressurized with a single common pressure source.

In some embodiments, only a single, wide focusing microchannel is present, and cells exiting the single focusing microchannel in a two-dimensional array may be distributed into multiple parallel deformation microchannels. Such embodiments may be employed, in particular, in studies where the lateral position of the cells is less critical, e.g., in studies where cell deformation is used to initiate cell activation without imaging the cells.

While the focusing microchannels may be exactly collinear with the associated deformation microchannels, this is not required. Specifically, the center of each focusing microchannel may be offset from the center of the associated deformation microchannel. As long as the offset is not too large, e.g., as long as the offset does not exceed approximately half the width or height of the focusing microchannel, the flow of the sample fluid will cause cells exiting the focusing microchannels to enter the associated deformation microchannel nevertheless.

For equalizing a flow velocity profile of the flow along a lateral direction before the sample fluid enters the focusing microchannels, an array of pillars extending perpendicular to the device plane may be arranged upstream of the array of focusing microchannels. In addition to achieving equalization of the flow velocity profile across the device, the array of pillars acts as a particle/cell filter to retain particles/cells that might otherwise clog the microchannels downstream.

The method may further comprise imaging cells in the sample fluid while they are passing through the array of deformation microchannels to obtain information of shapes of cells while they are in a deformed state in the deformation microchannels. Advantageously, the cells in multiple deformation microchannels are imaged in parallel by the same imaging device. In this manner, cells can be imaged and analyzed at extremely high throughput, e.g., at up to 100'000 cells/second. In addition, the cells may be also imaged before they enter the deformation microchannels and/or after they have exited the deformation microchannels.

To facilitate observation of cells before they enter the deformation microchannels, a transition region may be formed downstream of the array of focusing microchannels and upstream of the array of deformation microchannels. The transition region may lack any separating walls, such that portions of the flow that exit adjacent focusing microchannels are not laterally separated by separating walls in the transition region. This slows down the overall flow, thus facilitating observation of the cells after they have been focused in the focusing microchannels and before they are deformed in the deformation microchannels. For instance, the cells may be imaged in the transition region to enable a direct comparison of their shapes before and after deformation. In other embodiments, the cells are imaged in the transition region by a different method than in the deformation microchannels, e.g., by fluorescence imaging.

In a second aspect, the present invention provides a system for investigating cell deformations, the system comprising:
    a source of a sample fluid comprising cells suspended in a suspending medium;
    a microfluidic device; and
    a flow-generating device for generating the fluid flow through the microfluidic device.

The microfluidic device comprises at least one focusing microchannel and at least one deformation microchannel arranged downstream of the focusing microchannel and being aligned with the focusing microchannel such that cells that exit the focusing microchannel enters the deformation microchannel. The deformation microchannel is defined by deformation microchannel walls and configured to allow a flow of the sample fluid to be established through the deformation microchannel to cause deformation of the cells by a flow pattern created by interaction of the fluid flow with the deformation microchannel walls. The suspending medium is a non-Newtonian fluid, having viscoelastic properties such that cells that enter the focusing microchannel are focused towards a center of the focusing microchannel, causing the cells to exit the focusing microchannel in single file or in a two-dimensional array before they exit the focusing microchannel.

The system of the second aspect of the invention is configured to carry out the method of the first aspect of the invention when it is operated. Accordingly, the same considerations as for the method of the first aspect also apply to the system of the second aspect, in particular, considerations considering the arrangement, shapes and dimensions of the focusing and deformation microchannels in the microfluidic device as well as considerations relating to the composition and flow rates of the sample fluid.

The system may further comprise an imaging device configured to image cells in the sample fluid while they are flowing through the deformation microchannel to obtain information of shapes of cells while they are in a deformed state in the deformation microchannel. The imaging device may be configured to image cells in a plurality of deformation microchannels in parallel. In particular, the imaging device may be configured to image a region of interest that comprises at least a portion of each of a plurality of deformation microchannels. The imaging device may further be configured to image cells before they enter the deformation microchannels and/or after they have exited the deformation microchannels. In particular, the region of interest may include at least a portion of the transition region for obtaining images of cells while the cells are moving through the transition region.

In a third aspect, the present invention provides a microfluidic device for investigating cell deformations. The microfluidic device comprises:
    an inlet for admitting a sample fluid comprising cells suspended in a suspending medium into the microfluidic device;
    at least one focusing microchannel downstream of the inlet;
    an array of parallel deformation microchannels arranged in a device plane downstream of the at least one focusing microchannel, each deformation microchannel being defined by deformation microchannel walls, and
    an outlet arranged downstream of the array of deformation microchannels, the outlet allowing the sample fluid to exit the microfluidic device after it has flowed through the array of deformation microchannels,
    wherein each focusing microchannel is aligned with at least one associated deformation microchannel in such a manner that cells exiting said focusing microchannel enter said associated deformation microchannel,
    wherein each deformation microchannel is configured to cause a deformation of cells in the sample fluid by a flow pattern created by interaction of the fluid flow with the deformation microchannel walls.

The microfluidic device of the third aspect is particularly well-suited to be employed in the method of the first aspect of the invention. Accordingly, the same considerations as for the method of the first aspect also apply to the microfluidic device of the third aspect, in particular, considering the arrangement, shapes and dimensions of the focusing and deformation microchannels.

In particular, the microfluidic device of the third aspect enables the observation of cell deformations in multiple deformation microchannels in parallel, thereby facilitating high-throughput analyses.

In a fourth aspect, the present invention provides a cartridge that comprises:
    the microfluidic device of the third aspect,
    an inlet reservoir integrally bonded to the microfluidic device, the inlet reservoir communicating with the inlet of the microfluidic device; and
    an outlet reservoir integrally bonded to the microfluidic device, the outlet reservoir communicating with the outlet of the microfluidic device; and
    a pressure port for creating a pressure difference between the inlet reservoir and the outlet reservoir so as to generate the fluid flow through the microfluidic device.

By providing a compact, self-contained cartridge that integrates inlet and outlet reservoirs with the microfluidic device, handling is considerably simplified. A flow through the microfluidic device may be generated through the microfluidic device simply by applying hydraulic or pneumatic pressure to the pressure port, obviating the use of syringe pumps or the like.

BRIEF DESCRIPTION OF THE DRAWINGS

The terms Fig., Figs., Figure, and Figures are used interchangeably in the specification to refer to the corresponding figures in the drawings.

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Definitions

In the present disclosure, the term "microfluidic device" is to be understood as relating to a device in which a fluid is geometrically constrained along at least one dimension to a scale below 100 µm.

The term "microchannel" is to be understood as denoting a structure having at least one dimension smaller than 100 µm and a length that is larger than said dimension, for example 100 µm, 500 µm, 1 mm, 5 mm, 10 mm, 50 mm, 100 mm, 500 mm, 1000 mm, or any intermediate or longer length. In some embodiments, a microchannel may be formed by a groove in a surface of a solid body, which groove is covered by a second solid body. In other embodiments, a microchannel may be a tube. A cross-section of a microchannel, perpendicular to the channel's length, may be, for instance, rectangular, square, rounded, or circular.

The term "flow-generating device" is to be understood as relating to any device that is able to cause a flow of a sample fluid through a microchannel. A flow-generating device may be, e.g., a pump that exerts mechanical pressure on the sample fluid, for instance, a syringe pump or a peristaltic pump, or a pneumatic pressure source for creating a pneumatic pressure on a gas in contact with the sample fluid.

The term "source of a sample fluid" is to be understood as relating to any kind of reservoir or container that holds the sample fluid, or to any kind of device in which the sample fluid is formed in situ, e.g., a mixing device that receives two or more components of the sample fluid and combines these components to form the sample fluid.

A "suspending medium" may be any type of fluid that allows cells to be suspended in the fluid. In particular, the suspending medium will generally be a biocompatible aqueous liquid.

The term "Newtonian fluid" is to be understood in the usual manner as relating to a fluid in which the viscous stresses arising from its flow are linearly correlated to the shear strain rate. Accordingly, a "non-Newtonian fluid" is a fluid whose viscosity has an appreciable dependence on the shear strain rate. A "non-Newtonian fluid" may be, in particular, a "shear-thinning fluid", i.e., a fluid whose viscosity decreases under shear strain.

The term "imaging device" is to be understood as relating to any device that enables the acquisition of digital images of cells flowing through a microchannel. An imaging device may comprise, in particular, an image sensor, a light source, one or more optical elements for illuminating the microchannel using the light source, and one or more optical elements for imaging the microchannel to the image sensor. The image sensor may be a high-speed camera. The light source may be a stroboscopic light source, creating a rapid sequence of short light pulses, and the image sensor may be synchronized with the stroboscopic light source.

Microfluidic System of First Embodiment

Figure 1:
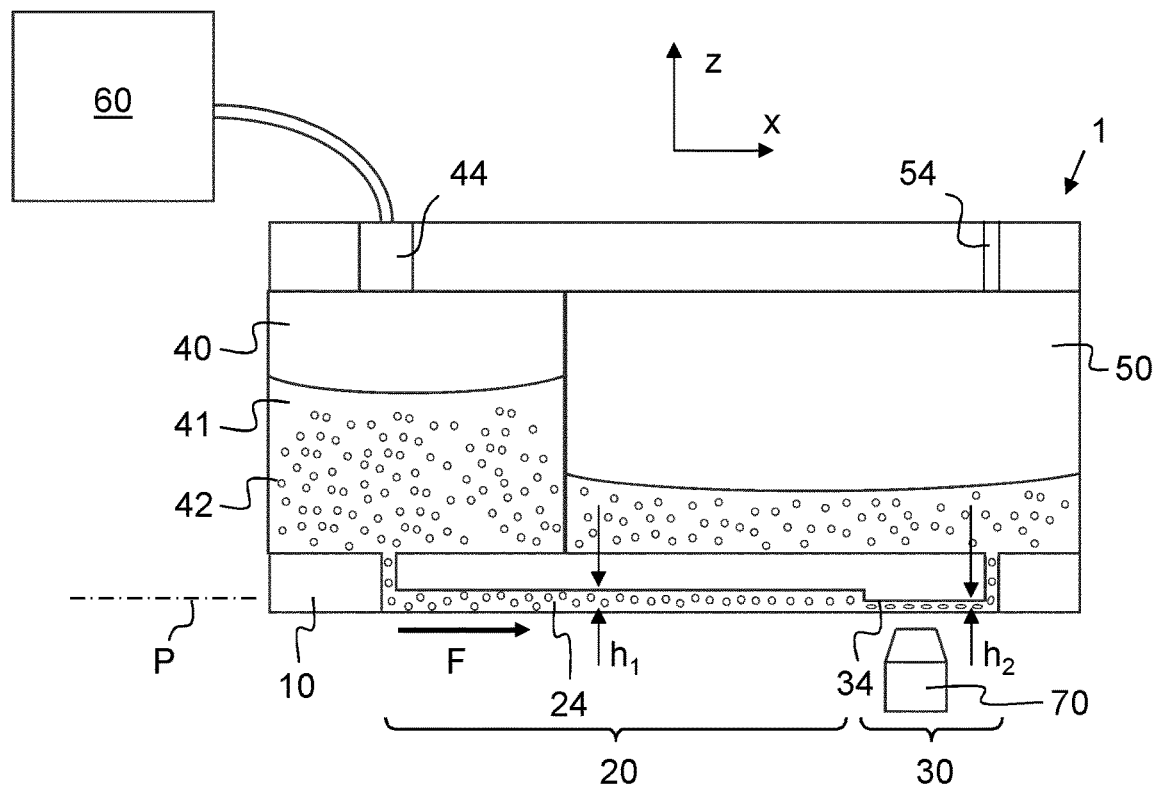
FIG. 1 shows a highly schematic side view of a microfluidic system according to a first embodiment of the invention.
Figure 2:
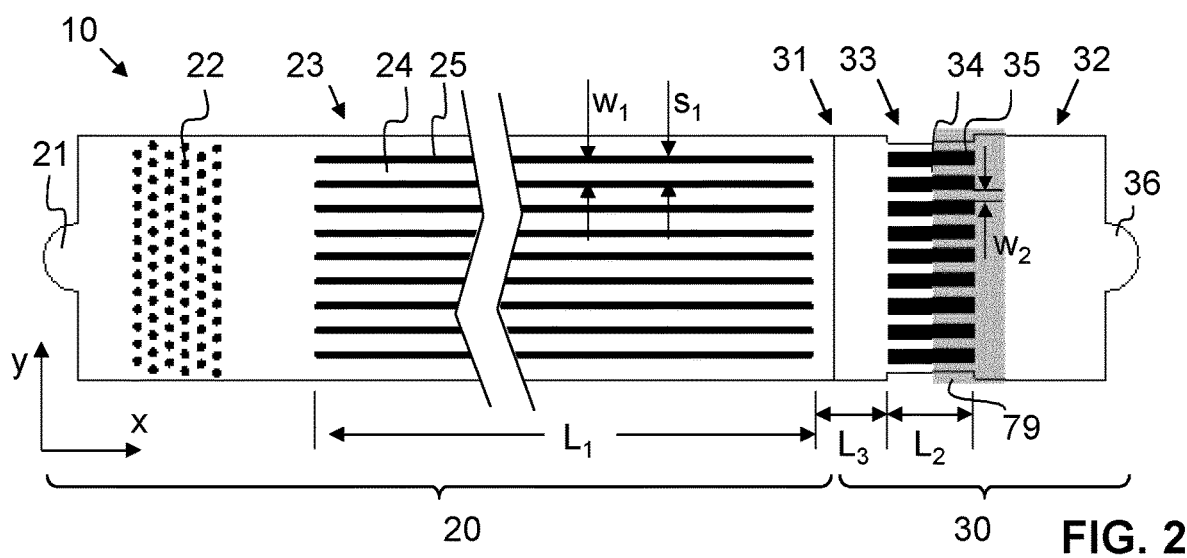
FIG. 2 shows a schematic top view of the microfluidic device of the system.
Figure 3:
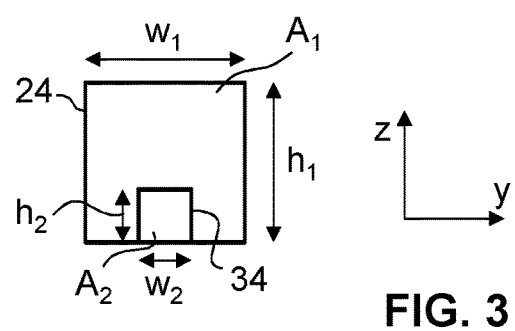
FIG. 3 shows an illustration of the relative cross-sectional dimensions of the focusing microchannels and the deformation microchannels of the microfluidic device.

FIGS. 1-3 illustrate, in a highly schematic manner, a microfluidic system according to a first embodiment. As apparent from FIG. 1, the system comprises a microfluidic cartridge 1, a flow-generating device in the form of a pressure source 60, and an optical imaging device 70.

The microfluidic cartridge 1 comprises a microfluidic device ("microfluidic chip") 10, an inlet reservoir 40 and an outlet reservoir 50. The inlet and outlet reservoirs 40 and 50 are integrally bonded to the microfluidic device 10. Thereby, a compact, self-contained cartridge is obtained, which can be easily transported, filled and pressurized. The inlet reservoir 40 has a pressure port 44, which may be hermetically sealed, e.g., by a removable plug or a pierceable septum (not shown). The inlet reservoir 40 may be filled with a sample fluid 41 through the pressure port 44, and pneumatic pressure may be applied to the inlet reservoir 40 via the pressure port 44. The outlet reservoir 50 has a vent port 54 to allow gas to escape from the outlet reservoir. The vent port may be configured to be permeable to gases while being essentially impermeable to aqueous liquids. For instance, the vent port may be closed by a gas-permeable membrane. Within the microfluidic device 10, a plurality of parallel focusing microchannels 24 are formed, followed by a plurality of parallel deformation microchannels 34.

The pressure source 60 applies pneumatic pressure to the pressure port 44 to pressurize the inlet reservoir 40. The resulting positive pressure difference between the inlet reservoir 40 and the outlet reservoir 50 causes the sample fluid 41 to flow through the focusing microchannels 24 and the deformation microchannels 34 along a flow direction F.

The sample fluid 41 comprises cells 42 suspended in a suspending medium. The suspending medium is a viscoelastic, shear-thinning non-Newtonian fluid, whose viscosity appreciably decreases with increasing shear strain. Specifically, the suspending medium may be an aqueous solution of a high-molecular mass polymer, for instance, PEO.

In FIG. 2, the microfluidic device 10 is illustrated by itself in a schematic top view on an enlarged scale. The microfluidic device 10 is formed as a flat chip, defining a device plane P. Directions within the device plane P are denoted as x and y, the x direction being the longitudinal direction of the microfluidic device 10, and the y direction being the lateral direction. The direction perpendicular to the device plane P is denoted as z. During use of the device, the z direction will generally be antiparallel to the direction of gravity, and the device plane P with the x and y directions will generally be oriented horizontally in space perpendicular to the direction of gravity. Accordingly, a dimension along the z direction will in the following be denoted as a "height", a dimension along the y direction will be denoted as a "width", and a dimension along the x direction will be denoted as a "length".

The microfluidic device 10 has two sections: a focusing section 20 and a deformation section 30. The focusing section 20 has an inlet 21, followed by a particle filter 22 comprising an array of pillar-like structures separated by gaps. Downstream of the particle filter 22, an array 23 of parallel focusing microchannels 24 is arranged. Adjacent focusing microchannels are laterally separated by channel walls 25. In the deformation section 30, downstream of the array 23 of focusing microchannels 24 of the focusing section 20, an array 33 of parallel deformation microchannels 34 is arranged. An outlet 36 is formed downstream of the array 33.

On its way through the microfluidic device 10, the sample fluid 41 first crosses the particle filter 22. The particle filter 22 retains any particulate matter that is larger than the gap size between the pillars of the particle filter 22. At the same time, the particle filter 22 creates an essentially uniform velocity profile of the flow F over the entire width of the microfluidic device 10 before the sample fluid 41 enters the array 23 of focusing microchannels 24. The sample fluid subsequently flows through the array 23 of focusing microchannels 24. In the focusing microchannels 24, cells 42 that are suspended in the sample fluid 41 are gradually focused towards the center of each focusing microchannel 24 along two dimensions, i.e., both along the width direction y and along the height direction z, such that they become aligned and exit each focusing microchannel in single file. Focusing is a consequence of the interaction of the viscoelastic properties of the suspending medium with the cells. The sample fluid 41 with the aligned cells 42 then enters the array 33 of deformation microchannels 34. Each focusing microchannel 24 is aligned with an associated deformation microchannel 34 such that the cells that exit said focusing microchannel 24 are received in the associated deformation microchannel 34 in a single file. In the deformation microchannels 34, the cells are deformed by the flow pattern of the sample fluid that is caused by the viscoelastic properties of the suspending medium and the narrow dimensions of the deformation microchannels 34. In particular, if the flow pattern is laminar, fluid flow at the boundaries to the channel walls will be very slow, while it will be rapid near the center of the deformation microchannels 34. This difference in flow velocity causes stresses on the surface of a cell traveling along a deformation microchannel, causing the cell to deform.

A transition region 31 between the arrays 23 and 33 is devoid of separating walls, which would otherwise laterally limit the partial flows emanating from the focusing microchannels. As a consequence, in the transition region, these partial flows are not laterally bounded by any walls. The cells that exit each focusing microchannel 24 in single file find their way into the associated deformation microchannel 34 even without separating walls due to the continuous fluid flow between these channels. Likewise, an outlet region 32 downstream of the array 33 of deformation microchannels 34 is devoid of separating walls, enabling the partial flows that emanate from the deformation microchannels to flow freely without being laterally bounded by any separating walls.

The optical imaging device 70 is illustrated in FIG. 1 only in a symbolic manner. It comprises a light source for illuminating a region of interest (ROI) 79 (see shaded area in FIG. 2) in the deformation section 30, and a high-speed video camera for acquiring images of the ROI. The ROI 79 encompasses a portion of each deformation microchannel 34 in the array 33. In this manner, cells that transit these channels are imaged by the imaging device 70 in parallel. Optionally, the ROI may further encompass at least a portion of the transition region 31 and/or a portion of the outlet region 32. In this manner, the cell shapes during deformation and the cell shapes before and/or after deformation may be compared. Image processing to separate and analyze the images of individual cells is straightforward. In this manner, each cell can be tracked individually, and the deformation of each cell can be analyzed separately.

In order to facilitate imaging in transmission, the inlet and outlet reservoirs may be separated by a gap in a region located above the ROI, so as to allow the ROI to be illuminated or observe from the top.

Single Wide Focusing Microchannel

In less demanding applications, the separating walls 25 between adjacent focusing microchannels 23 may be left away, resulting in a single wide focusing microchannel having a width that is much greater than its height. In such a focusing microchannel, the cells will be focused to a central horizontal plane of the single focusing microchannel, forming a two-dimensional array. Cells from this array will be automatically distributed into the multiple deformation microchannels by the flow through the device. While efficient focusing of the cells into a single horizontal plane perpendicular to the z direction is achieved in this manner, the method will be less accurate with respect to the positions of the cells along the lateral (y) direction.

Microfluidic System of Second Embodiment

Figure 4:
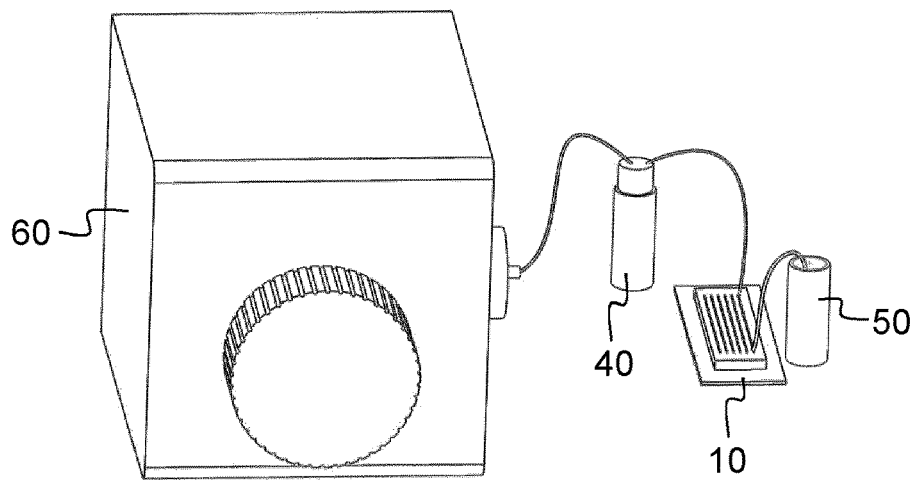
FIG. 4 shows a schematic perspective view of a microfluidic system according to a second embodiment.

FIG. 4 schematically illustrates a microfluidic system according to a second embodiment. As in the first embodiment, the system comprises a microfluidic device 10, an inlet reservoir 40, and outlet reservoir 50, and a pressure source 60. However, in contrast to the first embodiment, the inlet and outlet reservoirs 40, 50 are not integrated with the microfluidic device 10 to form a compact cartridge. Instead, they are connected to the inlet and outlet of the microfluidic device 10 via standard tubing.

Microfluidic Device of Third Embodiment

Figure 5:
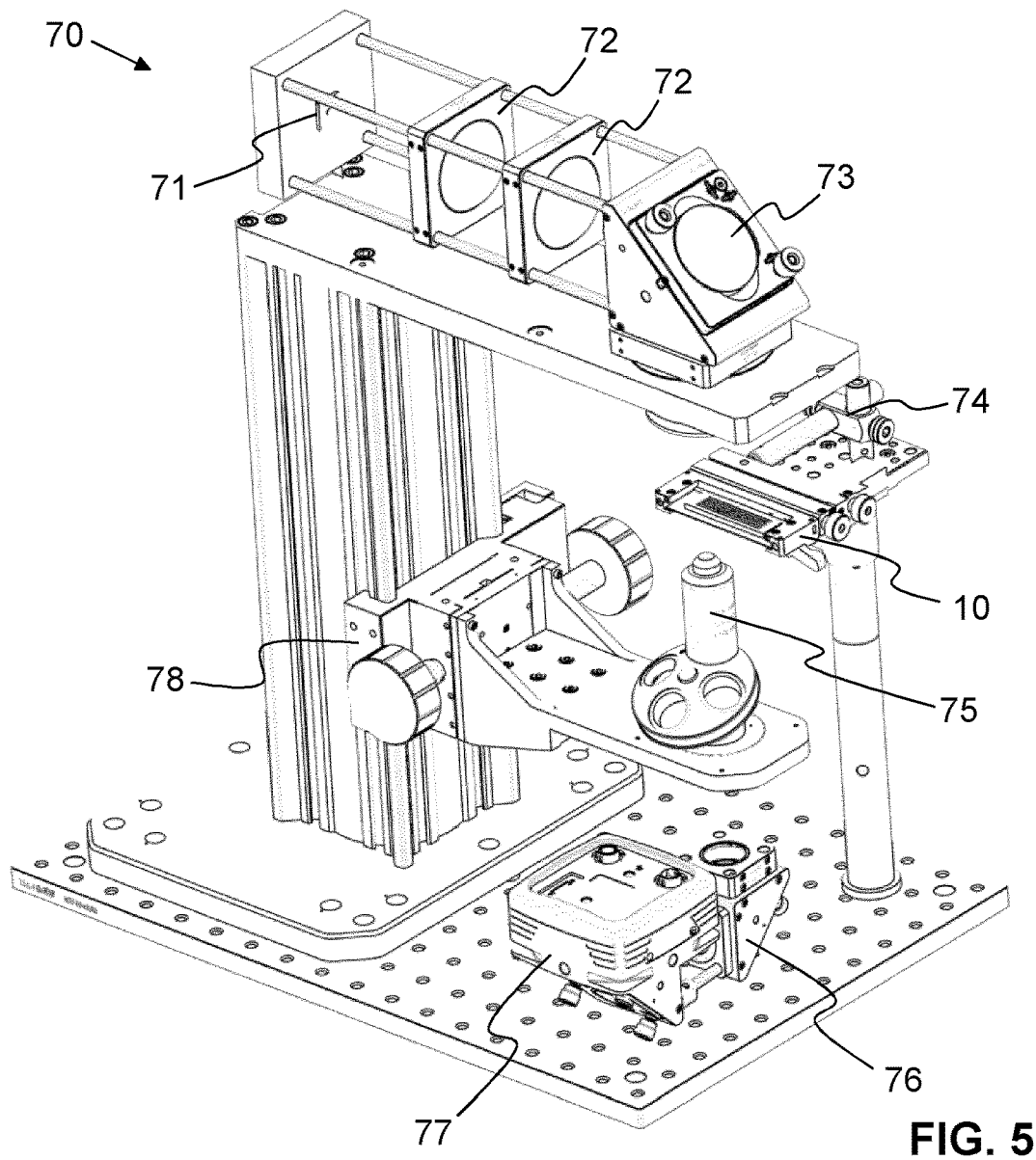
FIG. 5 shows a perspective view of a microfluidic system according to a third embodiment.

FIG. 5 schematically illustrates a microfluidic system according to a third embodiment. For simplicity, the inlet and outlet reservoirs and the pressure source are not illustrated in FIG. 5. FIG. 5 illustrates a possible optical imaging device 70 in more detail than FIGS. 1-4. In particular, the optical imaging device may comprise a light source 71, e.g., in the form of a high-power LED. Light from the light source 71 is collimated to an ROI in the microfluidic device 10 by one or more lenses 72 and one or more mirrors 73. The microfluidic device 10 is mounted on an x-y stage 74 for selecting the ROI. Light transmitted through the microfluidic device 10 is collected by an objective 75 and is guided to a high-speed camera 77 by optical elements 76, which may again include lenses and/or mirrors. For focusing purposes, the objective 75 is mounted on a z stage 78.

It goes without saying that FIG. 5 only shows an example of a suitable setup, and that other types of setup may be employed illuminating the ROI and for imaging the ROI to a camera or image sensor.

Dimensional Considerations

Several parameters influence how well focusing of the cells in the focusing microchannels will work, and how strongly the cells are deformed in the deformation microchannels. These parameters include the shapes, cross-sectional dimensions and lengths of the focusing and deformation microchannels, the viscoelastic properties of the suspending medium, the pressure difference between the inlet and outlet reservoirs, and the resulting flow velocities. As will be shown in the following, each of these parameters may vary within a rather large range.

The focusing microchannels 24 generally have different dimensions than the deformation microchannels 34. In particular, the focusing microchannels 24 are typically much longer than the deformation microchannels 34. For instance, in a specific embodiment, the focusing microchannels 34 may have a length of L1=30 mm, while the deformation microchannels may have a length of only L2=0.3 mm, i.e., the focusing microchannels may be longer by the deformation microchannels by a factor of 100. However, the exact length of the focusing microchannels is not critical as long as they are sufficiently long to achieve focusing of the cells into single file. Good results may be achieved already at a length as low as 10 mm. In addition, the length of the deformation microchannels is not critical. They should preferably be sufficiently long to cause the cells considerable deformation while they flow through the deformation microchannels, while not being longer than necessary in order to minimize the pressure drop across the array of deformation microchannels. In practice, a range of about 100 µm to about 1 mm may lead to good results.

As illustrated in FIG. 3, also the dimensions perpendicular to the flow direction F are generally different between the focusing microchannels and the deformation microchannels, both along a width direction in the device plane and along a height direction perpendicular to the device plane. In a specific embodiment, the focusing microchannels may have a square cross-section, with both width and height being $w_1=h_1=50$ µm, leading to a cross-sectional area of $A_1=2500$ µm², and the deformation microchannels may have a square cross section with both width and height being $w_2=h_2=15$ µm, leading to a cross-sectional area of $A_2=225$ µm², more than ten times less than the cross-sectional area of the focusing microchannels. Again, the exact dimensions may vary. Preferably, in order to achieve focusing of the cells in single file, the cross-section of the focusing microchannels has similar dimensions along both the width and the height directions. The exact cross-sectional shape and dimensions of the focusing microchannels are not critical. Focusing of cells to single file can be achieved with a large range of dimensions perpendicular to the flow direction as long as these dimensions are not too large, e.g., not more than 100 µm, and not too small, i.e., significantly larger than a typical cell diameter, e.g., not less than 30 µm. The dimensions of the deformation microchannels perpendicular to the flow direction should be slightly larger than a typical cell diameter in order to achieve maximum deformation without contact of the cells with the channel walls.

As a result of fabrication, the centers of each focusing microchannel and the associated deformation microchannel may be offset along the vertical direction z. In particular, the bottom walls of these channels may be coplanar, while the top walls may have an offset along the z direction, as illustrated in FIG. 3.

The width of the separating walls between adjacent focusing microchannels and the center-to-center spacings of the focusing and deformation microchannels are preferably kept as small as reasonably possible to minimize the required size of the ROI of the optical imaging device needed for imaging cells from all channels in parallel, and to avoid excessive turbulence in the transition region 31. In a specific embodiment, the wall thickness of the separating walls 25 between adjacent focusing microchannels 24 may be 10 µm, and the center-to-center spacing of the focusing and deformation microchannels may be $s_1=60$ µm.

Device Fabrication

FIGS. 6A-F schematically illustrate a fabrication process of a microfluidic device 10. As explained in more detail above, the microfluidic device may have two sections with two different channel heights. For instance, in a specific embodiment used for the experiments described below, the deformation section comprised ten parallel rectangular channels of 300 µm length, 15 µm width and 15 µm height, and the focusing section comprised ten parallel channels of 3 cm length, 50 µm height and 50 µm width. For fabricating the device, a negative master mold was created, using standard photolithographic technology, and was replicated in PDMS. To account for the different heights $h_1$ and $h_2$ of the two device sections, the master mold was fabricated in two steps by depositing and patterning two layer portions 82, 83 with different heights onto a silicon wafer 81.

For fabricating the master mold, two optical lithography masks were designed using AutoCad 2018 and were laser-printed on a 5 inch Cr/fused silica transparency mask. The first mask served for fabricating the deformation section, and the second mask served for fabricating the focusing section.

Figure 6A:
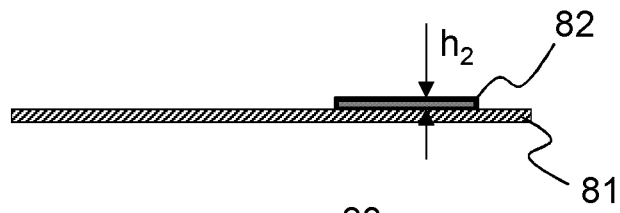
FIGS. 6A-F schematically illustrate a sequence of fabrication steps for fabricating a microfluidic device.

The first layer portion 82 was fabricated as follows: SU-8 2010 photoresist (PR) was spin coated (acceleration: 500 rpm/s, speed: 1500 rpm, time: 30 seconds) on the silicon wafer 81 (4 inch diameter) and prebaked (65° C. for 3 minutes and 95° C. for 9 minutes). Next, the photoresist was exposed to UV light at 140 mJ/cm² intensity, using the first mask, and post-baked (65° C. for 2 minutes and 95° C. for 4 minutes). The photoresist was developed in the developer for 3 minutes and hard-baked at 150° C. for 10 minutes. This resulted in the first layer portion 82, having height $h_2=15$ µm. The resulting situation is illustrated in FIG. 6A.

Figure 6B:
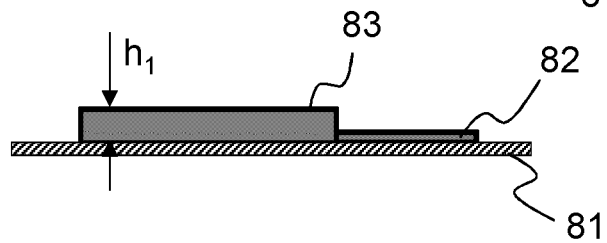

Next, the second mask was aligned with the first layer portion 82 by using mask aligners, as it is well known in the art. The second layer portion 83 was fabricated as follows: SU-8 2050 photoresist (PR) was spin coated (acceleration: 500 rpm/s, speed: 3000 rpm, time:30 seconds) on the silicon wafer 81 (which now included the first layer portion 82) and prebaked (65° C. for 3 minutes and 95° C. for 9 minutes). Subsequently, the photoresist was exposed to UV light at 150 mJ/cm² intensity, using the second mask, and post-baked (65° C. for 2 minutes and 95° C. for 4 minutes). The photoresist was developed in the developer for 5 minutes and hard-baked at 150° C. for 10 minutes. In this manner, the second layer portion 83, having height $h_1=50$ µm, was created side-by-side with the first layer portion. The resulting situation is illustrated in FIG. 6B.

Figure 6C:
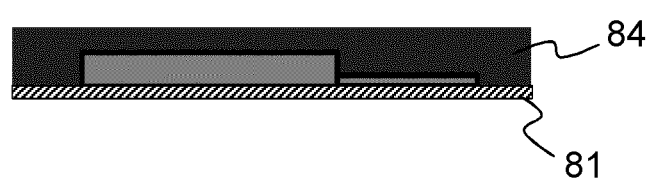

For replicating the microfluidic device from the master mold, a 10:1 mixture of polydimethylsiloxane (PDMS) monomer and curing agent (Sylgard 184, Dow Corning, Midland, MI, USA) was poured over the master mold and polymerized at 70° C. for 4 h. The resulting PDMS structure 84 is illustrated in FIG. 6C.

Figure 6D:
Figure 6E:
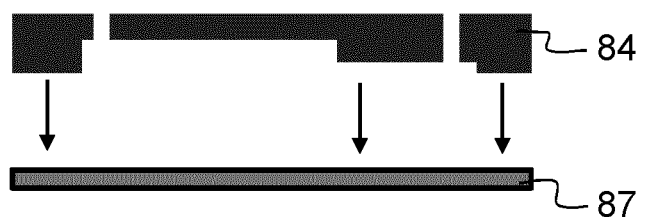
Figure 6F:
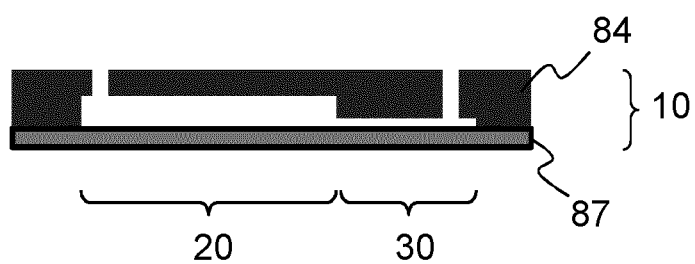

Inlet and outlet ports 85, 86 were created using a hole-puncher (SYNEO, West Palm Beach, FL, USA), see FIG. 6D. Afterward, the structured PDMS substrate was bonded to a 1 mm glass or a coverslip with thickness No. 1 (0.13-0.16 mm), or No 1.5 with thickness No. 1.5 (0.16-0.19 mm) substrate 87 after treating both surfaces in an oxygen plasma (EMITECH K1000X, Quorum Technologies, UK) for 60 s, see FIG. 6E. The finished device is illustrated in FIG. 6F.

Optical Imaging Device, Flow-Generating Device

For imaging purposes, a home-made microscope was built, having a setup as illustrated in FIG. 5. Microscopy components were purchased from THORLABS GMBH. 20× or 40× objectives (Nikon, Switzerland) and a high-speed camera (CB019MG-LX-X8G3, Ximea, Germany) were used. In order to record blur-free images, the camera was operated at a frame rate of 10000 images per second with an exposure time of 1 or 2 µs.

A pressure pump (Flow EZ, Fluigent, France) was used as a flow-generating device.

Flow Velocity Analysis for the Viscoelastic Fluid

Figure 7:
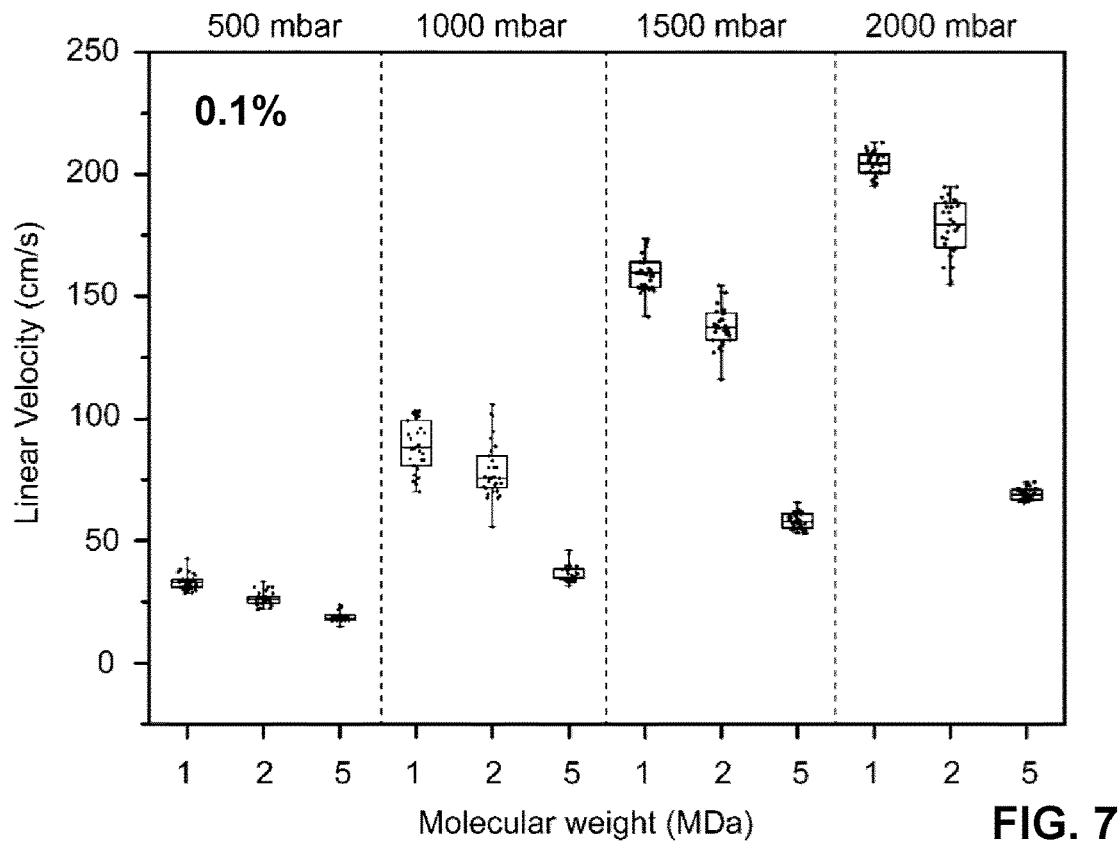
FIGS. 7-9 show diagrams illustrating the dependence of the flow velocity through the deformation microchannels on concentration and molecular mass of the polymer in the suspending medium and on the pressure difference between the inlet and the outlet of the microfluidic device.
Figure 8:
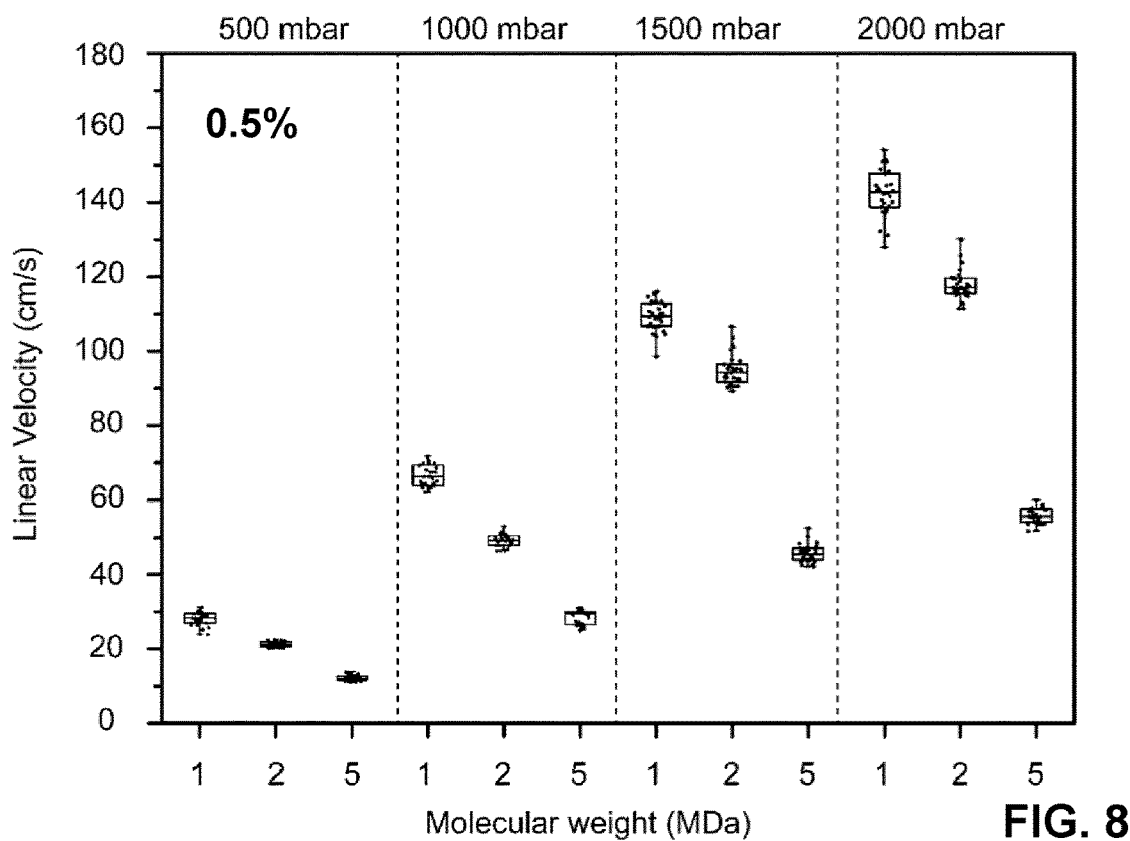
Figure 9:
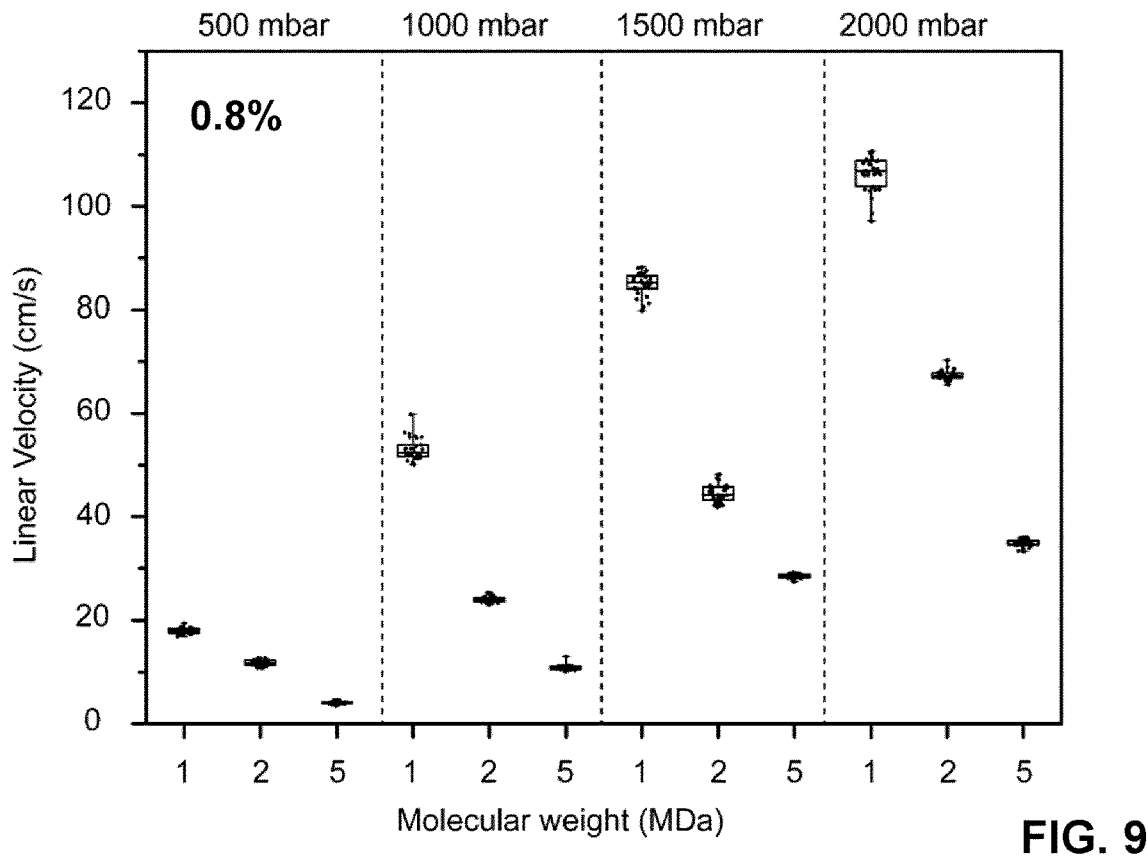

FIGS. 7-9 illustrate the dependence of the flow velocity through the deformation microchannels on the concentration and molecular mass of PEO in the suspending medium and on the pressure difference between the inlet and the outlet of the microfluidic device. The linear velocity of Jurkat cells (average diameter of 11 microns) carried in the deformation microchannels was determined for measuring the flow velocity.

The linear flow velocity was evaluated for the following parameter sets:
Polymer concentrations of 0.1%, 0.5% and 0.8%,
Pressures of 500, 1000, 1500, and 2000 mbar, and
Molecular masses of 1, 2 and 5 MDa.

The tested conditions led to a large variation of the flow velocity between less than 5 cm/s and more than 200 cm/s. The flow velocity decreased monotonically and non-linearly with increasing concentration and increasing molecular mass, while it increased with increasing pressure difference.

Under all these conditions, the cells were focused in the center of each focusing microchannel and left each focusing microchannel in a single file. This shows that the composition of the suspending medium and the applied pressure difference may be varied in a rather wide range without any detrimental effect on the focusing efficiency. The composition of the suspending medium, the pressure difference and the resulting flow rate may therefore be tailored to specific requirements of the cells to be investigated. For instance, stress on the cells due to shear strain may be limited by selecting a polymer having lower molecular mass, without compromising focusing efficiency or reducing throughput.

Deformability Analysis

Figure 10:
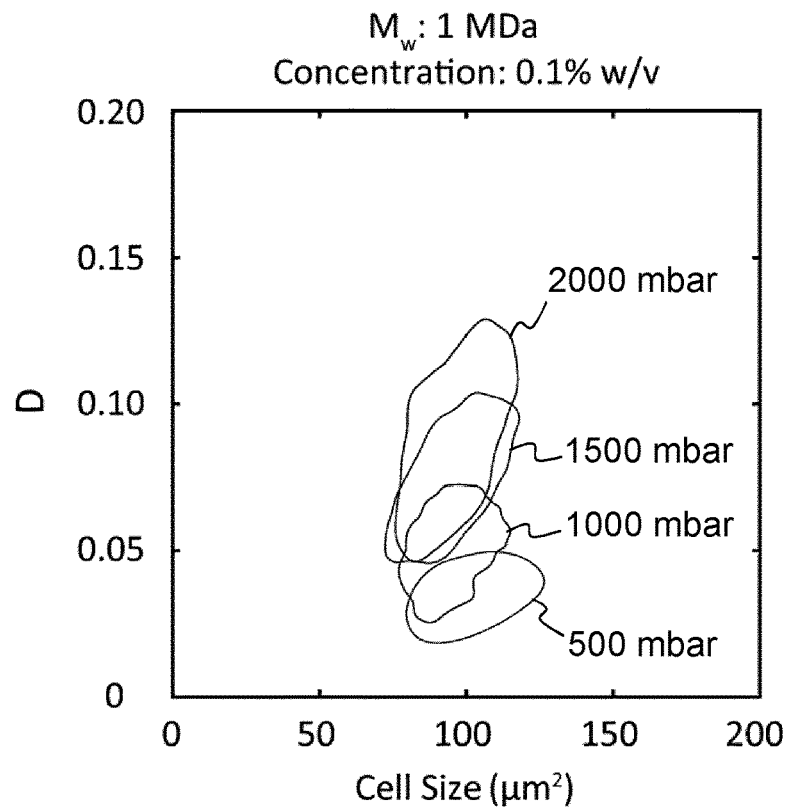
FIG. 10 shows a diagram illustrating the dependence of cell deformation on the pressure difference.
Figure 11:
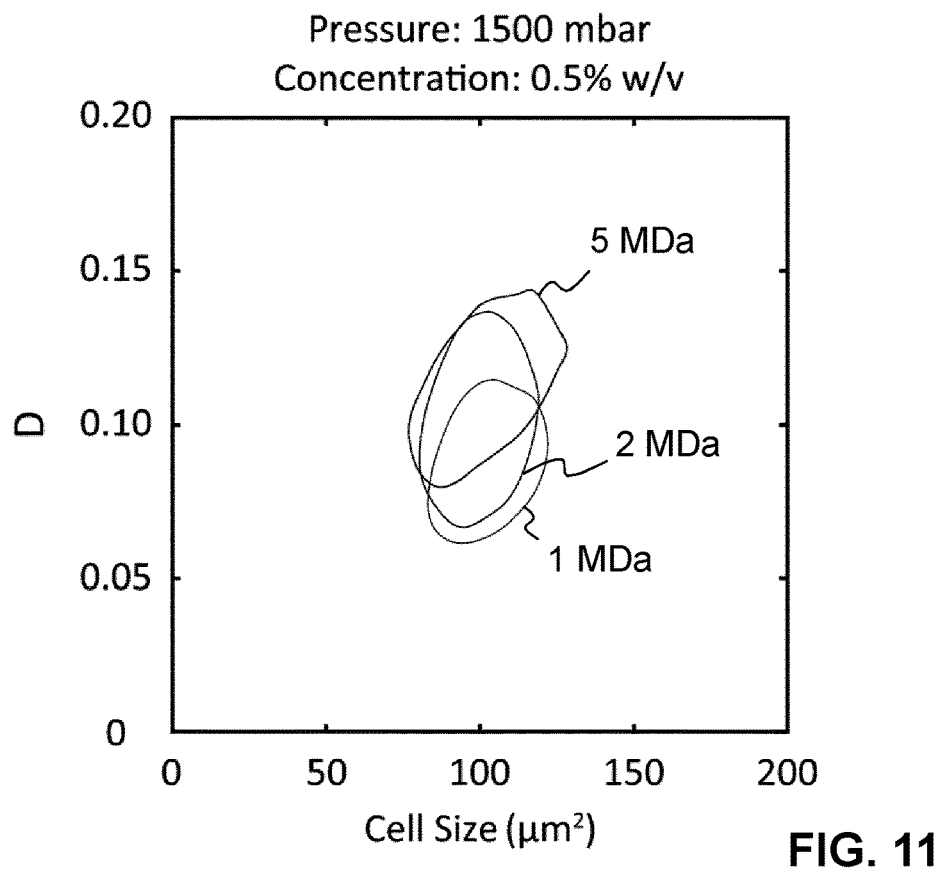
FIG. 11 shows a diagram illustrating the dependence of cell deformation on the molecular mass of the polymer in the suspending medium.
Figure 12:
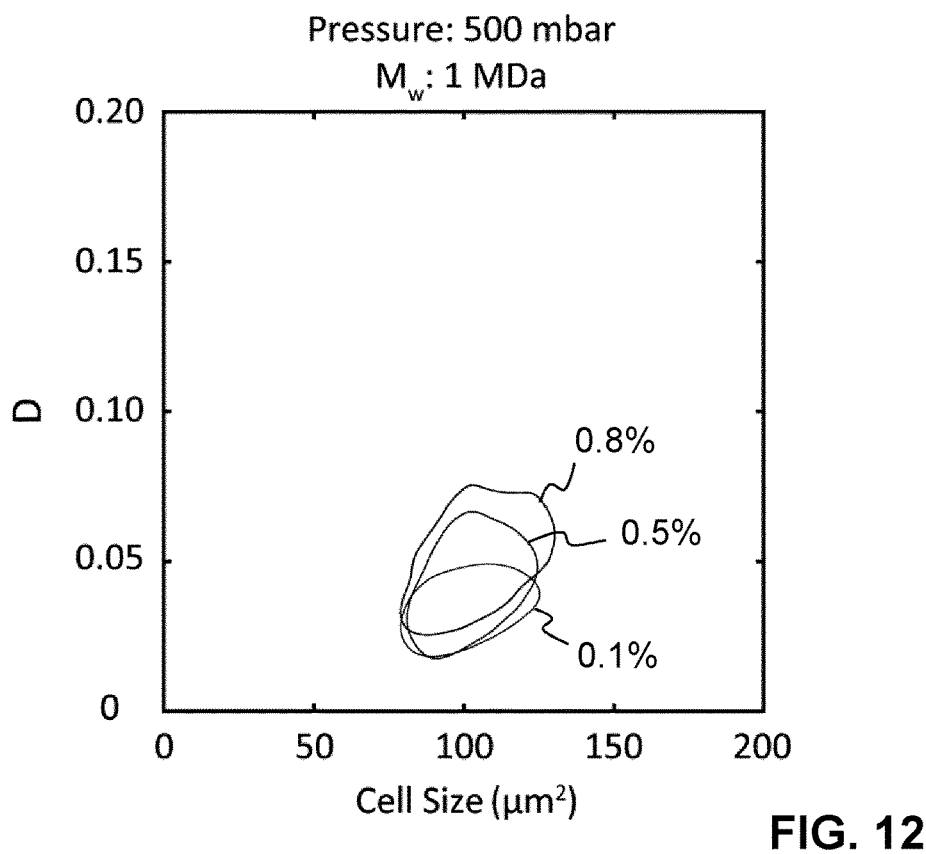
FIG. 12 shows a diagram illustrating the dependence of cell deformation on the concentration of the polymer in the suspending medium.

FIGS. 10-12 illustrate the dependence of cell deformation on the pressure difference and on the molecular mass and concentration of the polymer in the suspending medium. For each parameter set in each diagram, 5000 cells were imaged during their passage through the deformation microchannels. For each cell, the cell size was determined, being the area A of the cell in the microscope image. In addition, the length l of the cell perimeter was determined. A dimensionless deformation parameter (called "deformability") was calculated, using the formula $$D = 1 - \frac{2\sqrt{\pi A}}{l}.$$

A two-dimensional scatter plot was created, using the size and deformation parameter of the 5000 cells, and the density of the points in the scatter plot was evaluated to determine a single contour line at 50% density. The resulting contour lines are shown in FIGS. 10-12 for various parameter sets as follows:

FIG. 10: Molecular mass 1 MDa, concentration 0.1% w/v, pressure 500, 100, 1500 and 2000 mbar.
FIG. 11: Pressure 1500 mbar, concentration 0.5% w/v, molecular mass 1, 2 and 5 MDa.
FIG. 12: Pressure 500 mbar, molecular mass 1 MDa, concentration 0.1, 0.5 and 0.8% m/v.

FIG. 10 shows that the deformation parameter strongly increased with increasing pressure. This behavior is as expected. FIG. 11 illustrates that an increase in molecular mass of the suspending medium slightly increased cell deformations despite a decrease of flow velocity. Finally, FIG. 12 illustrates that an increase in polymer concentration had only little effect on cell deformations.

These experiments show that by tailoring polymer concentration and molecular mass, it is possible to tune the deformation of cells independently of the applied pressure, providing one additional degree of freedom for deformability analysis as compared to Newtonian fluids.

Application to Different Cell Lines

Figure 13:
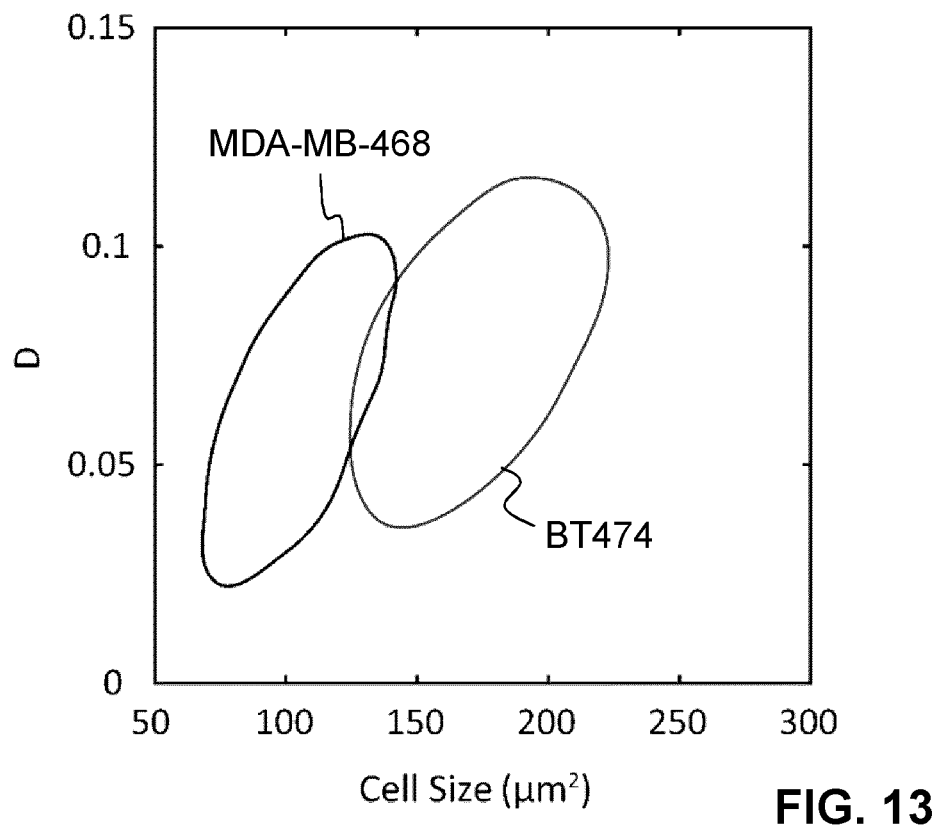
FIG. 13 shows a diagram illustrating deformabilities of two different breast cancer cell lines.

An application to the breast cancer cell lines MDA-MB-468 and BT474 is illustrated in FIG. 13. For each cell line, 5000 cells were imaged during their passage through a deformation microchannel. For each cell, the cell size and the deformation parameter were determined. For each cell line, the contour at 50% density was determined as described above. FIG. 13 shows these contours. The contours indicate that the two cell lines have considerable differences in size while having similar deformability.

Effect of Actin and Tubulin Drugs on Cell Deformability

To further validate the presently proposed approach to viscoelastic deformability cytometry, the aforementioned microfluidic device was used to study the effect of various pharmacological reagents on the cell mechanical properties of Jurkat cells. In the literature, it was shown that actin and microtubule networks strongly affect the cell mechanical properties. Therefore, corresponding reagents were used to alter those structures and investigate the consequent factors on cell deformation. Specifically, Latrunculin B (Lat B) and Cytochalasin D (Cyto D) alter actin, and Nocodazole (Noco) modifies the microtube network. Actin is a structural protein of the cell cytoskeleton and forms the cell shape and morphology in its filamentous form (F-actin). Microtubules are the long, rigid cylindrical biopolymers of assembled tubulin dimers unveiled to resist contractile forces and interact with other cytoskeletal polymers to stabilize the cytoskeleton.

Lat B and Cyto D were used to prevent filament polymerization, and Noco was used to stimulate the microtubule filament disassembly. Around 5000 cells were measured per run. Using viscoelastic deformability cytometry, cell size and deformation of single cells were measured. In short, suspended cells were introduced to the aforementioned microfluidics device inside the viscoelastic medium. By traveling along the focusing region, the cells aligned in single files in the parallel channels while hydrodynamic forces in the constriction region deformed the cells, and images were captured at the end of the deformation region. Cell size and deformability were determined as described above, and contour plots were prepared with a single contour line at 50% event density.

Figure 14:
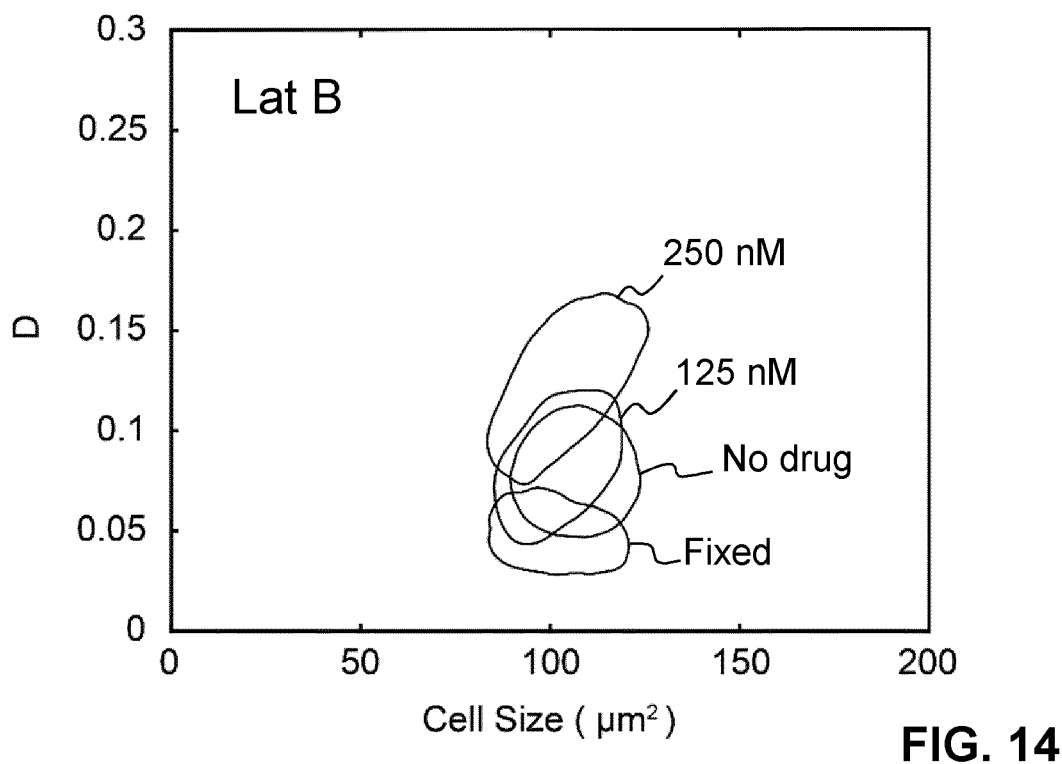
FIG. 14 shows a contour plot illustrating cell deformation of fixed Jurkat cells and of cells incubated without (control) and with different concentrations of Lat B.

For Lat B, 125 nM and 250 nM Lat B concentrations were used and compared with fixed and no drug cases as control measurements. An inlet pressure value of 1500 mbar was applied for all the experiments. FIG. 14 shows deformation versus cell size for the various Lat B drug concentrations, no drug, and fixed cells. Comparison of the contour plots reveals a considerable difference in deformability of the fixed and viable cells. The exposure of the control sample (no drug) to concentration of 125 nM shows a slight shift in the deformability of the cells. However, 250 nM concentration significantly shifts the population toward elevated deformation values.

Figure 15:
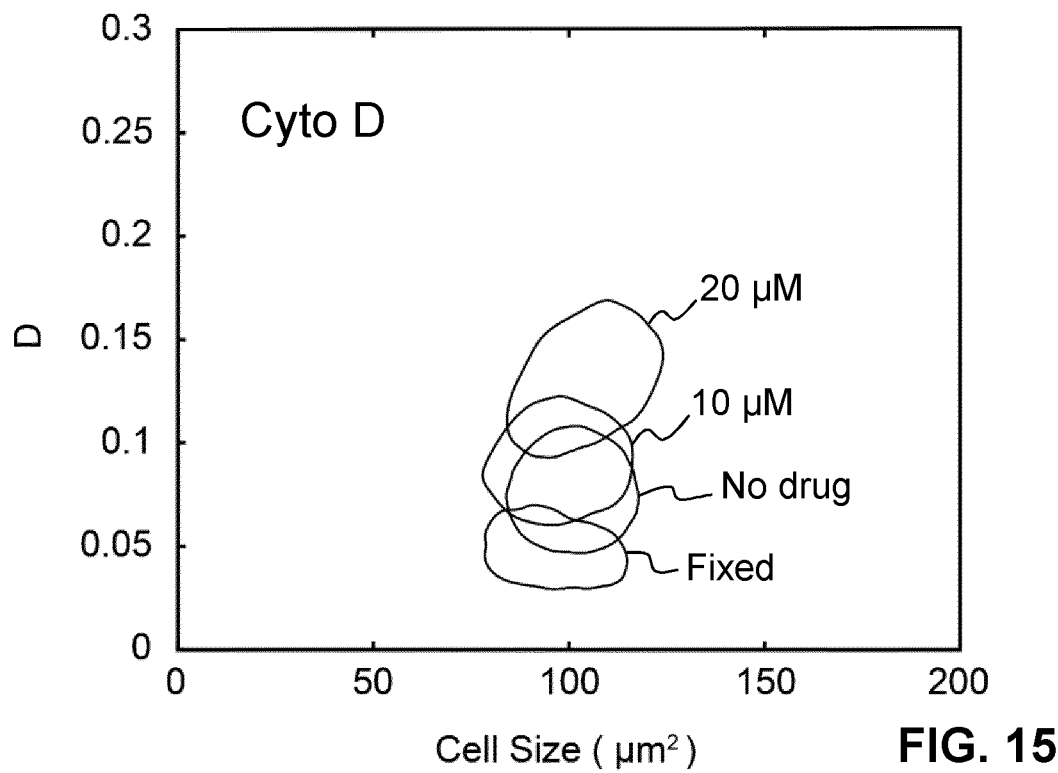
FIG. 15 shows a contour plot illustrating cell deformation of fixed Jurkat cells and of cells incubated without (control) and with different concentrations of Cyto D.
Figure 16:
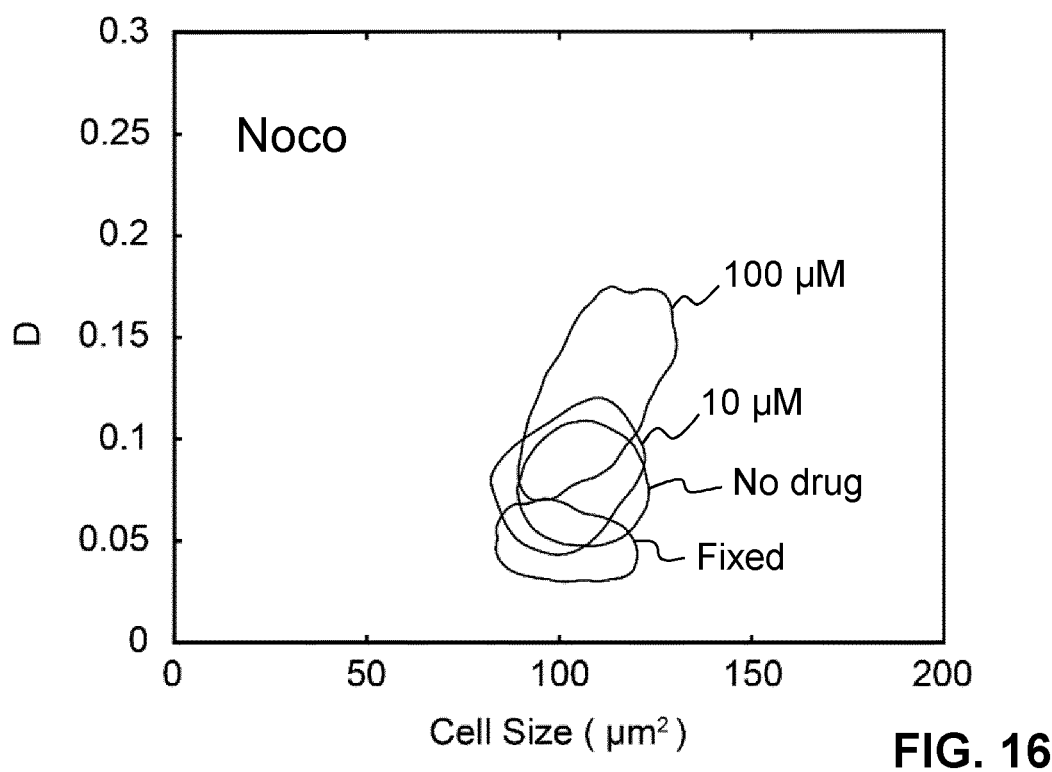
FIG. 16 shows a contour plot illustrating cell deformation of fixed Jurkat cells and of cells incubated without (control) and with different concentrations of Noco.

Similarly, Cyto D drug effect on actin depolymerization was investigated. For Cyto D, the concentrations of 10 µM and 20 µM show consequence elevations in the deformation values. (FIG. 15). For Noco, viable cells showed higher deformability compared to fixed cells. For 100 UM Noco, an upward shift of the population towards higher deformation was observed (FIG. 16).

In these experiments, treatments to modify cell stiffness via cell fixation and administration of Latrunculin B (Lat B) and Cytochalasin D (Cyto D), and Nocodazole (Noco) were performed as follows: Cyto D, Lat B, and Noco were dissolved in dimethyl sulfoxide (DMSO) according to standard protocols. The following concentrations were used to investigate the dose response: 10 µM and 20 µM of Cyto D; 10 µM, and 100 µM of Noco; and 125 nM, and 250 nM of Lat B. The DMSO was dissolved at low concentration of 0.1% in all experiments to minimize DMSO effect on cell deformation. Fixation was performed by addition of a 4% paraformaldehyde solution for 10 minutes at room temperature. To prevent the formation of cell aggregates, cells were subsequently washed with PBS supplemented with 10% FBS. For making viscoelastic solution, polyethylene oxide polymer (Mw: 1 MDa, Sigma-Aldrich, Buchs, Switzerland) were fully dissolved in PBS to a concentration of 1% (w/v). The prepared solution was then aged for one week at 4° C. to reach steady-state viscosity. Finally, PEO solution was added to PBS at concentrations of 0.1% for the deformability analysis.

Alternative Geometries

While in the above exemplary embodiments, both the focusing microchannels and the deformation microchannels were straight channels having uniform cross-sectional area, the geometries of these channels may vary.

Figure 17:
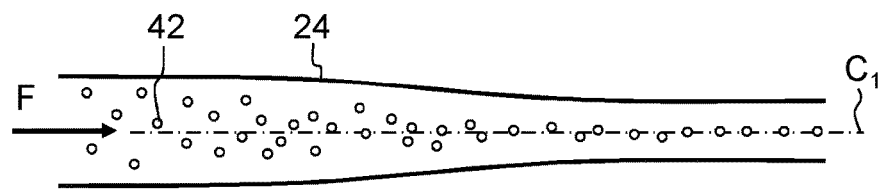
FIG. 17 shows a schematic sketch of an alternative geometry of a focusing microchannel.

FIG. 17 shows a schematic sketch of an alternative geometry of a focusing microchannel 24. The focusing microchannel tapers from its inlet end towards its outlet end, its width continuously decreasing while its height remains constant. Such a geometry may further aid in achieving focusing into single file along a centerline $C_1$. A channel having variable width but constant height can easily be created by the fabrication methods explained above.

Figure 18:
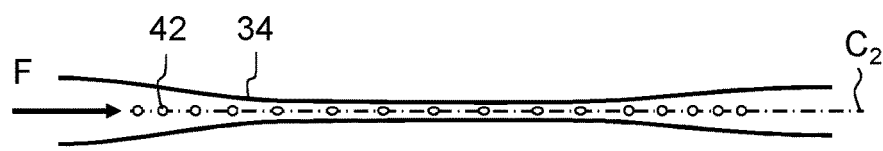
FIG. 18 shows a schematic sketch of an alternative geometry of a deformation microchannel.

FIG. 18 shows a schematic sketch of an alternative geometry of a deformation microchannel. The deformation microchannel has a first tapering portion where its width continuously decreases symmetrically with respect to the centerline $C_2$, followed by a portion of constant width, followed by a second tapering portion where its width continuously increases again. Such a geometry may be particularly useful for studying transient deformation changes while the cells travel through the channel.

Many other channel geometries are conceivable.

Multiple Inlets

Figure 19:
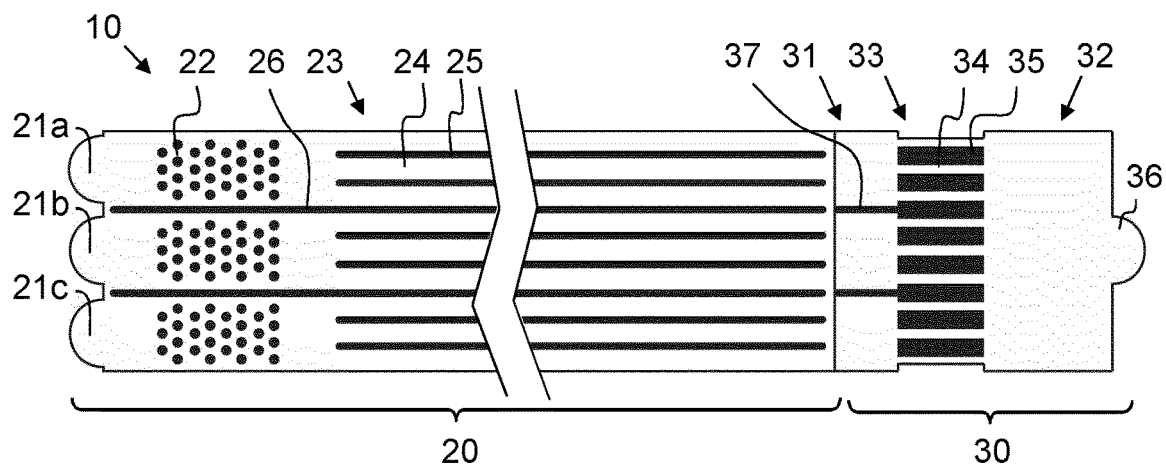
FIG. 19 shows a schematic top view of a microfluidic device according to a fourth embodiment.

FIG. 19 illustrates a further embodiment of a microfluidic device 10. The microfluidic device has a similar setup as the device of the first embodiment. However, in contrast to the first embodiment, the device has multiple (here: three) inlets 21*a*, 21*b*, and 21*c*. A different sample fluid may be supplied to each of the inlets 21*a*-21*c*. Between each inlet 21*a*-21*c* and the array 23 of focusing microchannels 24, the flows entering the device through the different inlets are separated by separating walls 26. In particular, in order to avoid mixing of the inlet flows, the separating walls extend longitudinally through the inlet filter 22, effectively creating three separate inlet filters. The separating walls 26 further cause the array 23 of focusing microchannels 24 to be effectively divided into three parallel sub-arrays, each sub-array receiving a different sample fluid. Between the array 23 of focusing microchannels 24, further separating walls 37 are provided. These separating walls 37 divide the transition region 31 into three sub-regions, each sub-region receiving a different sample fluid when the respective sample fluid exits the array 23 of focusing microchannels 24. As a result, also the array 33 of deformation microchannels 34 is effectively divided into three sub-arrays, each sub-array receiving a different sample fluid. The sample fluids are combined only once they have left the array 33 of deformation microchannels 34.

By providing different cell lines in each sample fluid, this arrangement allows studying deformations of multiple different cell lines simultaneously, using a single device. A single common pressure source may be used to pressurize the inlet reservoirs for the three sample fluids.

Key Advantages

The key advantages of the proposed system may be summarized as follows:

i. The system enables deformability measurements at ultra-high throughput (currently up to 100'000 cells per second).

ii. Only one single pressure pump is required for generating a flow of the sample fluid. No sheath flow is required for focusing the cells, owing to the viscoelastic focusing capability. This considerably reduces complexity of the device.

iii. The use of filtration pillars downstream of the inlet allows reaching a uniform velocity profile for each focusing and consequently also in each deformation microchannel.

iv. Multiple deformed cells may be imaged at the same time owing to parallelization. The images of the cells may be analyzed in real time.

v. A transition region between the focusing microchannels and the deformation microchannels causes cells to slow down, allowing for the capturing of fluorescent images of whole cells before deformation. In addition, a wide outlet region may be present downstream of the deformation microchannels. This particularly allows studying mechanobiology of cells, for example T-cell activation due to mechanical forces.

vi. The elastic properties of the suspending medium allow same cell deformation to be achieved at a lower linear velocity compared to a Newtonian carrier fluid.

vii. The elasticity of the carrier fluid can be tuned by changing the polymer concentration in addition to velocity. This allows stress exerted on the cells from the carrier fluid to be adjusted.

viii. The described system may be also be used to measure rheological properties of the cells by imaging their transient deformation along the narrow channel.

The invention claimed is:

1. A microfluidic device for investigating cell deformations, the microfluidic device comprising:
   an inlet for admitting a fluid flow of a sample fluid comprising cells suspended in a suspending medium into the microfluidic device, the fluid flow defining a flow direction through the microfluidic device;
   at least one focusing microchannel downstream of the inlet;
   an array of parallel deformation microchannels arranged in a device plane downstream of the at least one focusing microchannel; and
   an outlet arranged downstream of the array of deformation microchannels, the outlet allowing the fluid flow to exit the microfluidic device after it has passed through the array of deformation microchannels,
   wherein the at least one focusing microchannel is aligned with at least one associated deformation microchannel in such a manner that cells exiting said focusing microchannel enter said associated deformation microchannel, and
   wherein each deformation microchannel is configured to cause deformation of said cells by hydrodynamic forces caused by a flow pattern created by interaction of the fluid flow with walls of the deformation microchannel,
   wherein the at least one focusing microchannel has a first cross-sectional area perpendicular to the flow direction, the first cross-section area being constant or varying along the flow direction, having a minimum,
   wherein each deformation microchannel has a second cross-sectional area perpendicular to the flow direction, the second cross-sectional area being constant or varying along the flow direction, having a minimum, and
   wherein the constant first cross-sectional area or the minimum of the first cross-sectional area is larger than the constant second cross-sectional area or the minimum of the second cross-sectional area.

2. The microfluidic device of claim 1, comprising:
   an array of parallel focusing microchannels arranged in the device plane, the array of parallel focusing microchannels being arranged downstream of the inlet such that sample fluid that enters the microfluidic device through the inlet is received by a plurality of the focusing microchannels in the array, wherein each focusing microchannel is aligned with at least one associated deformation microchannel in such a manner that cells exiting each said focusing microchannel enter said associated deformation microchannel.

3. A microfluidic cartridge comprising:
   the microfluidic device of claim 1;
   an inlet reservoir bonded to the microfluidic device, the inlet reservoir communicating with the inlet of the microfluidic device; and
   an outlet reservoir bonded to the microfluidic device, the outlet reservoir communicating with the outlet of the microfluidic device; and
   a pressure port for creating a pressure difference between the inlet reservoir and the outlet reservoir so as to generate the fluid flow through the microfluidic device.

4. The microfluidic device of claim 2, comprising an array of pillars extending perpendicular to the device plane upstream of the array of focusing microchannels to equalize a flow velocity profile of the flow along a lateral direction.

5. The microfluidic device of claim 2, comprising a transition region downstream of the array of focusing microchannels and upstream of the array of deformation microchannels, the transition region being devoid of separating walls, such that portions of the fluid flow that exit adjacent focusing microchannels are not laterally separated by separating walls in the transition region.

6. The microfluidic device of claim 1, wherein the constant first cross-sectional area or the minimum of the first cross-sectional area is larger than the constant second cross-sectional area or the minimum of the second cross-sectional area by at least a factor of 4.

* * * * *